(No Model.)
D. H. KLOTZ.
STATION INDICATOR.
No. 254,554. Patented Mar. 7, 1882.
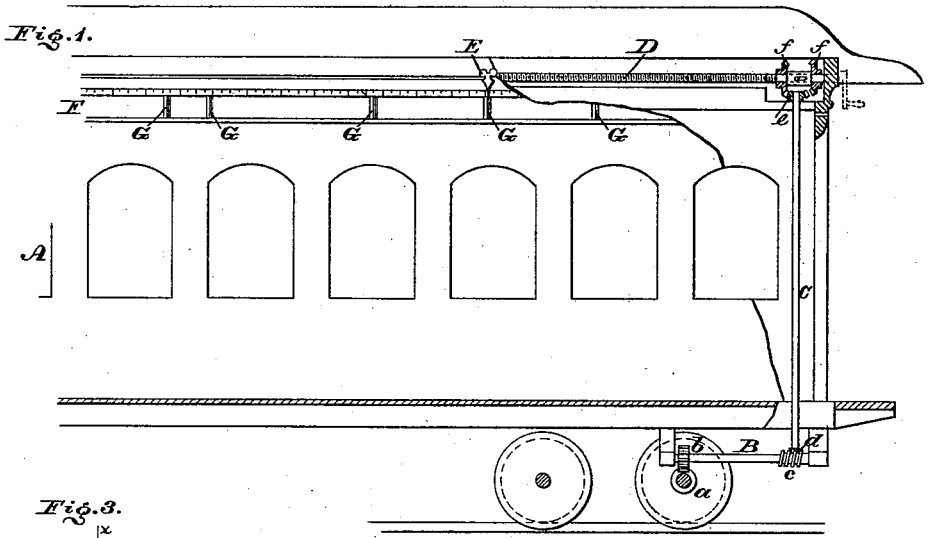
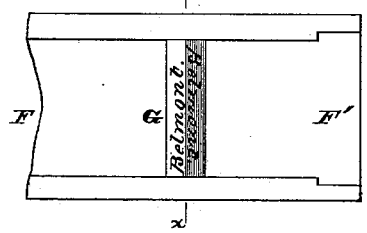
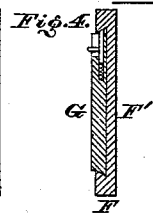
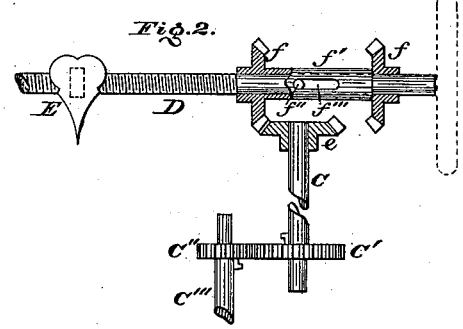
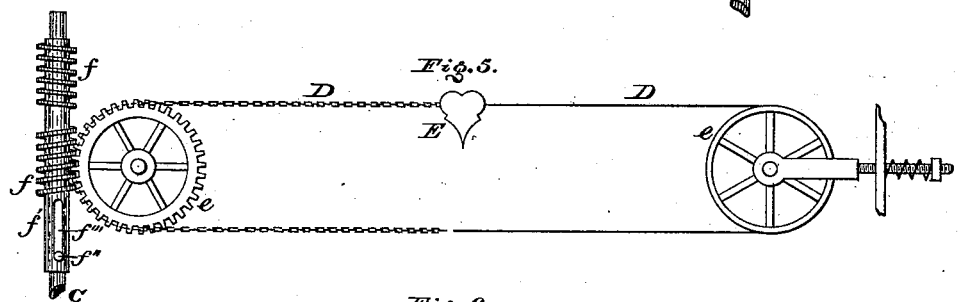
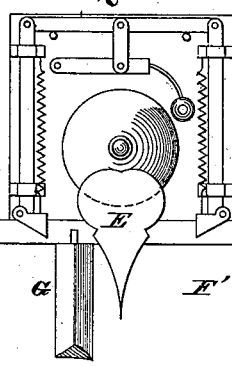
Witnesses:
A. P. Grant
W. F. Kircher
Inventor:
Daniel H. Klotz
by John A. Biedershein
ATTORNEY.
N. PETERS, Photo-Lithographer, Washington, D. C.

UNITED STATES PATENT OFFICE.

DANIEL H. KLOTZ, OF PHILADELPHIA, PENNSYLVANIA.

STATION-INDICATOR.

SPECIFICATION forming part of Letters Patent No. 254,554, dated March 7, 1882.

Application filed February 19, 1881. (No model.)

*To all whom it may concern:*

Be it known that I, DANIEL H. KLOTZ, a citizen of the United States, residing in the city and county of Philadelphia and State of Pennsylvania, have invented a new and useful Improvement in Station-Indicators, which improvement is fully set forth in the following specification and accompanying drawings, in which—

Figure 1 is a vertical section of a car having my invention applied to it. Fig. 2 is an enlarged section of a portion thereof. Fig. 3 is a face view of a portion of a sign-board embodying my invention. Fig. 4 is a transverse section thereof. Fig. 5 is a side elevation of a modification. Fig. 6 is a view of an alarm which may be employed.

Similar letters of reference indicate corresponding parts in the several figures.

My invention relates to improvements in station-indicators which are operated by power derived from the running-gear of the car to which the indicator is affixed.

The invention consists of a stationary sign-board having upon it the names of the stations in their proper order and relative distances, and an index or pointer which traverses the sign-board at a rate corresponding to the motion of the train. Provision is made for reversing the motion of the index or pointer when required, and also harmoniously adjusting or setting the name-blocks of the sign relatively to the stations.

Referring to the drawings, A represents a car which, excepting so far as is necessary for my invention, is of well-known form and construction. On the axle of the forward or rear wheels is fixed a worm, $a$, which gears with a worm-wheel, $b$, on a horizontal shaft, B, properly mounted on the running-gear or body of the car and carrying a worm, $c$, which gears with a worm-wheel, $d$, on the lower end of an upright shaft, C, which is properly mounted on the body of the car, the shaft B being preferably flexible, so as to compensate for the curvature of the road and consequent vibrations or swaying of the truck, whereby the gearing $a\,b\,c\,d$ is properly held together and prevented from binding. The shaft C carries at its upper end a bevel-wheel, $e$, which meshes with a bevel-wheel, $f$, fixed to the end of a horizontally-arranged screw, D, termed a "leading-screw," properly mounted on the upper part of the body of the car and carrying an index or pointer, E, fitted on the screw, so that by rotation of the latter said index is caused to travel or traverse partly or entirely the length of the car.

Located within the body of the car, in proximity to the index or pointer E, is a sign-board, F, consisting of a frame or board, F', of sufficient length to hold as many name-blocks G as there are stations on the road, the names of the stations being printed, painted, or otherwise suitably affixed to the blocks, the latter being movably fitted to the frame or board F' so as to be longitudinally adjusted, or toward and from each other relatively to the designated distance between the stations to be indicated. The blocks may be held in position on the frame F' by dovetailed joints, tongues and grooves, bolts, latches, &c., illustrations of which are found in Figs. 3 and 4.

In lieu of the bevel-wheels $e\,f$ as gearing for the shaft C and screw D, I may use a worm and worm-wheel or other gearing; and the screw D may be dispensed with, and in lieu thereof a chain, belt, or band, D, may be employed as a carrier for the index E, in which case one of the wheels $e$ is geared with the shaft C, and may be a worm-wheel, the worm $f$ being on the shaft C.

The operation is as follows: When the car is moved the rotation of the wheel imparts motion to the shafts B C, whereby the conveyer or carrier D is operated and the index or pointer E caused to traverse the sign-board F, and when a station is reached said index points to the name thereof on one of the blocks G, thus indicating to the passengers the fact of reaching the station. In primarily adjusting or setting the name-blocks G the car is started, and when a station is reached a block with the name of the same is applied to and shifted on the frame F' until it registers or coincides with the index or pointer E. The block retains its adjusted position, and the station will be announced at the place said block occupies in either direction of the road. When the train has reached the terminus of the road the several stations being successively indicated, the trip in the opposite direction causes the index to return to its first position, and so indicates the stations of the return trip. Should, however, in making up the train, or from the nature of the depots or tracks, the cars be reversed on the return trip, it will be necessary to reverse the rotation of the carrier D, in order to cause return motion of the latter. For this purpose the gear-wheel $f$ or worm $f$ is connected to a sleeve, $f'$, which is fitted on the conveyer D or the shaft C, and attached to the same by means of a pin, $f'''$, which, fixed to the shaft, projects through a slot, $f''''$, in said sleeve $f'$. The wheel or worm $f$ is duplicated on said sleeve, the wheels $f$ facing each other, or the pitch of the worms being reversed. It is evident that by shifting the sleeve $f'$ the other wheel or worm $f$ may be brought into gear with the wheel $e$, and thus the carrier moves in the opposite direction.

In the setting up of the apparatus, the length of the carrier or conveyer D, and the speed of rotation or movement thereof, the extent of movement of the index E, the adjustment of the name-blocks, and the nature of the shafting and gearing will be in accordance with the number of stations of the road, the several parts being timed, spaced, or constructed in order to produce harmony of operation or registering of the index and name blocks.

In Fig. 2 the shaft C carries a spur-wheel, $C'$, which meshes with a spur-wheel, $C''$, on a shaft, $C'''$, to which the motion of the car-wheels is imparted, both wheels, $C'$ $C''$, being removable, so that wheels of varying diameters may be substituted, and thus adjust or regulate the speed of the conveyer or carrier D.

It is evident that the parts may be so disposed that the sign-board may be properly located at the side or top of the car-body, or be made part of the body.

The sign-board may be made removable or duplicated, so that should a car run beyond the terminus of its line the stations of the connecting-route may be shown, and the service of indication continued.

The attention of the passenger may be directed to the name of the approaching station on the block G by an alarm suitably operated, a form thereof being shown in Fig. 6. In this case the legs of the frame which carry the bell-hammer have tripping-pieces, the advance one of which operates in either direction before the station is reached, and is inoperative after the index has passed the name-block, the operation of the alarm being automatical in both directions of the road.

The name plates or blocks G are V-shaped or doubly beveled, as shown, so as to present two faces, whereby the name of the station may be read in every part of the car, and, if desired, strips of paper or other material may be substituted for the blocks, or the names of the stations may be painted or otherwise directly affixed to the sign-board or the body of the car after the place for the same is determined or adjusted.

In addition to the names of stations, the names of important objects or places of interest of the route may be noted on the sign-board, as well as graduations of miles, squares, &c.

By shifting the sleeve $f'$ so that the gearing $e$ $f$ is disconnected, and by attaching to the carrier D a hand-wheel or crank-handle, provision is made for setting the index relatively to the name-plate.

It will be noticed that the indicator embodying my invention is serviceable for cars running on long or short routes without special modifications, whether the cars are propelled by animal, steam, or other power.

It will also be observed that the indicator presented does not require the attention of the train-hands, and shifting of trains does not affect the accuracy of operation of the device.

I am aware that it is not new to construct a station-indicator of an index, a conveyer therefor, and shafting and gearing operated by one of the wheels of the car for operating said conveyer, and therefore disclaim such feature.

Having thus described my invention, what I claim as new, and desire to secure by Letters Patent, is—

1. In a station-indicator, the index E, conveyer D, and shaft C, in combination with the reversing-wheels $f$, connected to each other by the sliding sleeve $f'$, the gear-wheel $e$, and suitable gearing, whereby the motion of the driving-wheel is transferred to said shaft C, substantially as and for the purpose set forth.

2. The index, conveyer, and sign-board frame, in combination with the gear-wheel $e$, shaft C, shaft $C'''$, and removable timing-wheels $C'$ $C''$, and with the driving-wheel and gearing, substantially as and for the purpose set forth.

3. In a station-indicator, the index E, conveyer D, sign-board frame F, having movable name-blocks G, shaft C, the removable timing-wheels $C'$ $C''$, and the driving-wheel and connecting-gearing, combined and operating substantially as and for the purpose set forth.

D. H. KLOTZ.

Witnesses:
JOHN A. WIEDERSHEIM,
W. F. KIRCHER.